United States Patent
Chung et al.

(10) Patent No.: US 9,692,617 B2
(45) Date of Patent: Jun. 27, 2017

(54) ELECTRONIC APPARATUS AND METHOD FOR IMPROVING QUALITY OF TRANSMITTED SIGNAL, AND SYSTEM FOR THE SAME

(71) Applicant: Samsung Electronics Co., Ltd., Gyeonggi-do (KR)

(72) Inventors: Il-Hyung Chung, Gyeonggi-do (KR); Cheol-Ho Lee, Gyeonggi-do (KR); Dae-Woong Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/193,203

(22) Filed: Jun. 27, 2016

(65) Prior Publication Data
US 2016/0380785 A1    Dec. 29, 2016

(30) Foreign Application Priority Data
Jun. 29, 2015  (KR) .......................... 10-2015-0092464

(51) Int. Cl.
*H03H 7/40*    (2006.01)
*H04L 25/03*   (2006.01)
*H04B 1/40*    (2015.01)

(52) U.S. Cl.
CPC ......... *H04L 25/03031* (2013.01); *H04B 1/40* (2013.01); *H04L 25/03878* (2013.01)

(58) Field of Classification Search
CPC ............... H04L 25/03878; H04L 27/01; H04L 25/03885; H04B 3/14; H04B 3/141; H04B 3/144; H03H 7/38; H03F 2203/45526; H01L 23/5227; H01L 23/645; H01L 23/647; H01L 23/66; G11B 5/035; H03G 5/025

See application file for complete search history.

(56) References Cited

U.S. PATENT DOCUMENTS 8,073,181 B2   12/2011  Bakalos et al.
9,094,240 B2    7/2015  Song et al.
9,432,230 B1 *  8/2016  Chang .................... H04L 27/01
(Continued)

FOREIGN PATENT DOCUMENTS

KR   10-2014-0125936 A    10/2014

*Primary Examiner* — Khanh C Tran
(74) *Attorney, Agent, or Firm* — Cha & Reiter, LLC.

(57) ABSTRACT

The present disclosure relates to an improvement in the quality of a transmitted signal, and more particularly, to an electronic apparatus and a method which are provided with a passive equalizer improving the quality of a transmitted signal when a signal is transmitted/received to/from an external apparatus, and a system for the same. The present disclosure provides a signal transmission system for improving the quality of a transmitted signal. The signal transmission system may include a transmitter that transmits a signal; a receiver that receives the signal from the transmitter; a channel that is formed between the transmitter and the receiver and transmits the signal delivered by the transmitter; and a passive equalizer that is formed between the transmitter and the receiver and controls the signal so as to have a higher impedence than a predetermined impedance at a lower frequency than a predetermined frequency of the signal.

14 Claims, 7 Drawing Sheets

(56) References Cited

U.S. PATENT DOCUMENTS

| | | | |
|---|---|---|---|
| 2006/0197679 A1* | 9/2006 | Yamagishi | H04L 25/0298 340/855.4 |
| 2007/0030092 A1* | 2/2007 | Yeung | H04B 3/145 333/28 R |
| 2008/0310521 A1* | 12/2008 | Otsuka | H04L 25/028 375/257 |
| 2009/0206962 A1* | 8/2009 | Chou | H04B 3/14 333/28 R |
| 2016/0173299 A1* | 6/2016 | Islam | H04L 25/03057 375/233 |

* cited by examiner

# ELECTRONIC APPARATUS AND METHOD FOR IMPROVING QUALITY OF TRANSMITTED SIGNAL, AND SYSTEM FOR THE SAME

CLAIM OF PRIORITY

This application claims the priority under 35 U.S.C. §119(a) to Korean Application Serial No. 10-2015-0092464, which was filed in the Korean Intellectual Property Office on Jun. 29, 2015, the entire content of which is hereby incorporated by reference.

TECHNICAL FIELD

The present disclosure relates to an improvement in the quality of a transmitted signal, and more particularly, to an electronic apparatus and a method which are provided with a passive equalizer improving the quality of a transmitted signal when a signal is transmitted/received to/from an external apparatus, and a system for the same.

BACKGROUND

An electronic apparatus (e.g., a Personal Computer (PC), a portable terminal, etc.) can include an interface for transmitting/receiving data to/from an external electronic apparatus. Representatively, an electronic apparatus may include a Universal Serial Bus (USB) terminal, and may transmit/receive data to/from the external electronic apparatus through the USB terminal, or may transmit/receive data to/from the external electronic apparatus through a wireless communication module (e.g., Wi-Fi, Bluetooth, etc.).

The USB provides PC users with an enhanced and easy-to-use interface that connects an incredibly diverse range of peripherals to their computers. Among the many advantages of the USB is a reduction in the proliferation of cables which may affect even the smallest computer installations.

Also, the USB provides simple connectivity to users. The USB can eliminate the need to have different connectors for printers, keyboards, mice, and other peripherals, and can support a wide variety of data types, from slow mouse inputs to digitized audio and compressed video.

Today's USB devices that can all communicate with a host computer system over USB include USB printers, scanners, digital cameras, storage devices, card readers, and the like. USB-based systems may require that a USB host controller be present in the host system, and that an operating system (OS) of the host system support USB and USB mass storage class devices. USB devices may communicate over the USB bus at low speed, full speed, high speed, or super speed. A USB electronic device may support only USB 2.0 or may support both USB 2.0 and USB 3.0, according to the required USB data transmission speed. In the USB 2.0, a connection between the USB device and the host includes a power line, a ground line, and data communication lines D+ and D−. When a USB device is connected to the host, the USB device first pulls a D+ line high (a D− line when the device is a low-speed device) by using a pull-up resistor on the D+ line. The host may respond by resetting the USB device. When the USB device is a high-speed USB device, the USB device may chirp by driving the D− line high during the reset. The host may respond to the chirp by alternately driving the D+ and D− lines high. The USB device may then bypass the pull-up resistor, and may continuously perform communication at high speed.

When such an USB is connected to the electronic apparatus and data is transmitted/received between the USB and the electronic apparatus, the electronic apparatus may use an equalizer to improve the quality of transmitted data (or a transmitted signal). The equalizer may be inserted into a transmission circuit or an amplification circuit. The equalizer compensates for signal loss of a high-frequency signal generated from a channel. Examples of equalizers may include an active equalizer or a passive equalizer. An active equalizer may also be known as a continuous time linear equalizer. A passive equalizer may use a resistor and an inductor. Since the passive equalizer would have passive components, the passive equalizer would have low manufacturing costs, and can be used for a high-speed interface, such as Peripheral Component Interconnect express (PCIe), USB 3.0, and the like.

SUMMARY

However, signal transmission systems, which include a passive equalizer including an inductor and resistor can have a low impedance at low frequencies. Accordingly, another device will not initially recognize a device when the signal transmission system detects the USB 2.0 connection. Also, in the signal transmission system which includes the passive equalizer including the inductor and the resistor in order to recognize the USB 2.0 according to the related art, when 3.3 V is applied to a D+ line of the transmitter, a D− line of the transmitter also rises to 3.3 V and a short-circuit can occur, so that the signal transmission system cannot initially recognize the USB 2.0.

Accordingly, it is necessary to provide a signal transmission system including a passive equalizer capable of recognizing a device in the conventional USB 2.0 interface.

Therefore, various embodiments of the present disclosure provide an electronic apparatus and a method which are provided with a passive equalizer improving the quality of a transmitted signal, and a system for the same.

In order to solve the above-mentioned technical problems, in accordance with an aspect of the present disclosure, a signal transmission system for improving the quality of a transmitted signal is provided. The signal transmission system may include a transmitter that transmits a signal; a receiver that receives the signal from the transmitter; a channel that is formed between the transmitter and the receiver and transmits the signal delivered by the transmitter; and a passive equalizer that is formed between the transmitter and the receiver and controls the signal so as to have have a higher impedance than a predetermined impedance at a lower frequency than a predetermined frequency of the signal.

Also, in order to solve the above-mentioned technical problems, in accordance with another aspect of the present disclosure, a method for improving the quality of a transmitted signal in a signal transmission system is provided. The method may include transmitting a signal, by a transmitter; controlling the transmitted signal so as to have a high impedence than a predetermined impedance at a lower frequency than a predetermined frequency of the signal, by a passive equalizer; and receiving the controlled signal, by a receiver.

Various embodiments of the present disclosure provide the electronic apparatus and the method which are provided with a passive equalizer improving the quality of a signal, and the system for the same. Accordingly, when the quality of a signal is improved in the case of a high-speed signal, use is made of a passive equalizer rather than an active equalizer, so that costs can be reduced. Also, conventionally, since a passive equalizer having an L-R structure is applied, the signal transmission system has a low impedance at a low frequency, and cannot recognize a signal of USB 2.0. However, according to various embodiments of the present disclosure, a passive equalizer having a C-L-R structure is applied, so that the signal transmission system can have have an impedence exceeding 1500 ohms at a frequency less than 1000 Hz and can recognize a signal of USB 2.0.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Hereinafter, embodiments of the present disclosure will be described with reference to the accompanying drawings. The present disclosure may have various modifications and embodiments and thus will be described in detail with reference to specific embodiments illustrated in the drawings. However, it should be understood that the present disclosure is not limited to the particular embodiments, but includes all modifications, equivalents, and/or alternatives within the spirit and scope of the present disclosure. In connection with descriptions of the drawings, like reference numerals designate like elements.

In the present disclosure, the expression "include" or "may include" refers to existence of a corresponding function, operation, or element, and does not limit one or more additional functions, operations, or elements. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the present disclosure.

In the case where an element is referred to as being "connected" or "accessed" to other elements, it should be understood that not only the element is directly connected or accessed to the other elements, but also another element may exist between them. Contrarily, when an element is referred to as being "directly coupled" or "directly connected" to any other element, it should be understood that no element is interposed therebetween.

In the present disclosure, the terms are used to describe a specific embodiment, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as that understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning.

An electronic device according to the present disclosure may be a device including a display control function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to some embodiments, the electronic device may be a smart home appliance with a display control function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to another embodiment, the electronic devices may include at least one of various medical devices {e.g., a magnetic resonance angiography (MRA), a magnetic resonance imaging (MRI), a computed tomography (CT) machine, and an ultrasonic machine}, navigation devices, global positioning system (GPS) receivers, event data recorders (EDR), flight data recorders (FDR), vehicle infotainment devices, electronic devices for ships (e.g., navigation devices for ships, and gyro-compasses), avionics, security devices, automotive head units, robots for home or industry, automatic teller's machines (ATMs) in banks, or point of sales (POS) in shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a display control function. The electronic device according to the present disclosure may be a combination of one or more of the aforementioned various devices. Also, the electronic device according to the present disclosure may be a flexible device. Further, it is obvious to those skilled in the art that the electronic device according to the present disclosure is not limited to the aforementioned devices.

Hereinafter, an electronic device according to various embodiments will be described with reference to the accompanying drawings. The term "user" used in the various embodiments may refer to a person or a device using the electronic device.

Figure 1A:
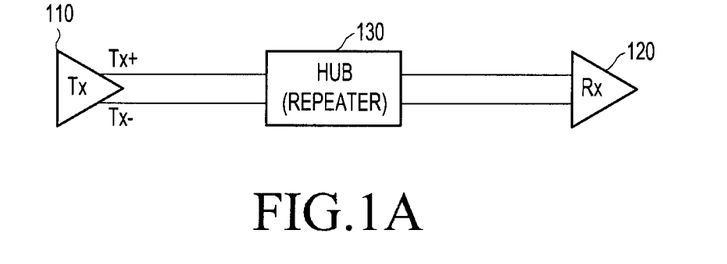
FIG. 1A is a view illustrating an example of a signal transmission system including a hub in a USB 2.0 interface.
Figure 1B:
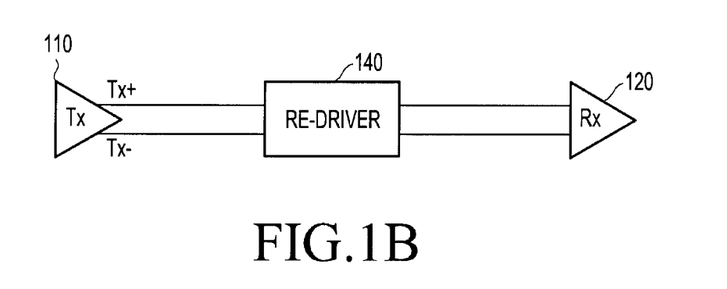
FIG. 1B is a view illustrating an example of a signal transmission system including a re-driver in a USB 3.0 interface.
Figure 1C:
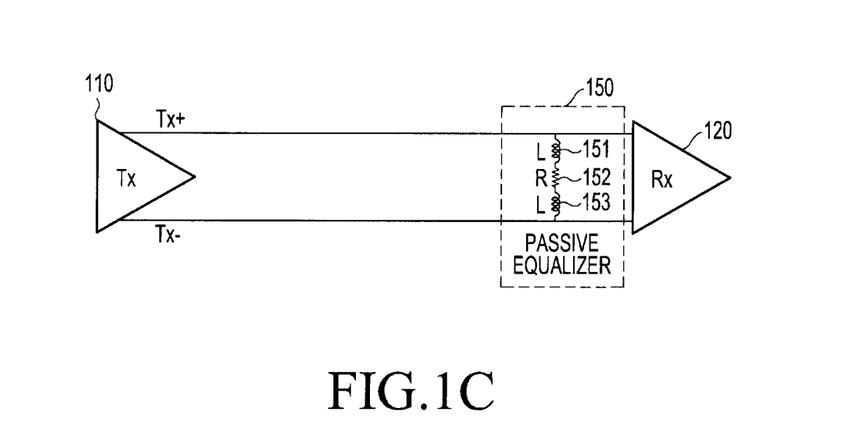
FIG. 1C is a view illustrating an example of a signal transmission system including a passive equalizer including an inductor and a resistor.

FIG. 1A is a view illustrating an example of a signal transmission system including a hub. FIG. 1B is a view illustrating an example of a signal transmission system including a re-driver. FIG. 1C is a view illustrating an example of a signal transmission system including a passive equalizer including an inductor and a resistor.

Referring to FIG. 1A, the signal transmission system including the hub may include a transmitter 110, a receiver 120, and the hub 130. The hub 130 compensates for path loss of a signal transmitted by transmitter 110 over a channel to the receiver 120 and improves the quality of the signal. The hub 130 may be disposed between the transmitter 110 and the receiver 120 in the channel, and may compensate for path loss.

Referring to FIG. 1B, the signal transmission system including the re-driver may include the transmitter 110, the receiver 120, and the re-driver 140. The re-driver compensates for path loss of a signal transmitted from the transmitter 110 over the channel to the receiver 120, thereby improving the quality of the signal. The re-driver 140 may be disposed between the transmitter 110 and the receiver 120 in the channel, and may compensate for path loss.

Each of the signal transmission systems illustrated in FIG. 1A and FIG. 1B compensates for a signal by using an active component between the transmitter 110 and the receiver 120, and may improve the quality of a signal by using a passive component instead of the active component (e.g., a hub and a re-driver).

Referring to FIG. 1C, a signal transmission system, which includes the passive equalizer including the inductor and the resistor may include the transmitter 110, the receiver 120, and the passive equalizer 150 that compensates for the loss of a signal generated from a channel between the transmitter 110 and the receiver 120 and improves the quality of the signal. The passive equalizer 150 may be disposed between the transmitter 110 and the receiver 120 in the channel, and may compensate for path loss of a signal transmitted by the transmitter 110 over the channel to the receiver 120. The passive equalizer 150 may include two inductors 151 and 153, and one resistor 152, and the two inductors 151 and 153, and the one resistor 152 may be connected in parallel to the channel.

Figure 2:
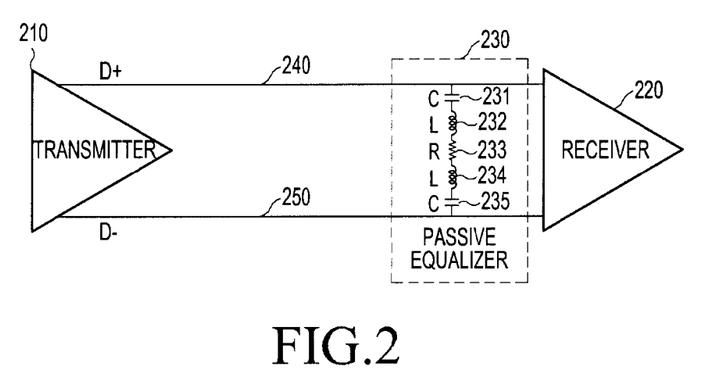
FIG. 2 is a view illustrating an example of a signal transmission system including a passive equalizer in a USB 2.0 interface according to an embodiment of the present disclosure.

FIG. 2 is a view illustrating an example of a signal transmission system including a passive equalizer in a USB 2.0 interface according to an embodiment of the present disclosure.

Referring to FIG. 2, the signal transmission system, which includes the passive equalizer in the USB 2.0 interface according to an embodiment of the present disclosure, may include a transmitter (or a driver) 210 that transmits a signal, a receiver 220 that receives the signal, a channel 240 and 250 that transmits/receives a signal (or data) between the transmitter 210 and the receiver 220, and a passive equalizer 230 that compensates for the path loss of a signal propagated over channel 240 and 250 between the transmitter 210 and the receiver 220, thereby improving the quality of the signal.

The transmitter 210 may convert a signal, a voice, music, an image, data, and the like into an electrical signal, and may deliver the electrical signal in the form of a current transmitted through an electrical cable, a waveguide, or a line of a Printed Circuit Board (PCB). The channel 240 and 250 may be formed between the transmitter 210 and the receiver 220 and may transmit transmitted signal having various frequencies from the transmitter 210 or other devices. In this case, the channel 240 and 250 may include a board, a cable, a connector, a socket, and the like. Also, the receiver 220 may receive a signal and may output the signal. In this case, the receiver 220, that reconstructs a sound, an image, text, or a code from the received signal, may refer to an element that receives the signal.

The passive equalizer 230 may be disposed between the transmitter 210 and the receiver 220, and may compensate for path loss of a signal which is output from the transmitter 210 and may transmit the signal, of which the compensation for the loss has been performed (now referred to as the "compensated signal"), to the receiver 220. The passive equalizer 230 may include first and second inductors 232 and 234, one resistor 233, and first and second capacitors 231 and 235, and the first and second inductors 232 and 234, the one resistor 233, and the first and second capacitors 231 and 235 may be connected in parallel to the channel 240 and 250.

It is noted that that path loss may be different at different frequencies. The passive equalizer 230 may be formed between the transmitter 210 and the receiver 220, and may compensate for attenuation at different signal frequencies through an input terminal along the channel and may equalize transfer characteristics up to a maximum frequency. The passive equalizer 230 may compensate for frequency-dependent attenuation of a channel at a transmitter or a receiver of a high-speed serial link used in various electronic apparatuses. The passive equalizer 230 may be an element that reconstructs, to its original state, a high-speed digital signal which has deteriorated in a high-speed serial link in various electronic apparatuses, such as a mobile phone, a PC, a tablet PC, a laptop computer, a Personal Digital Assistant (PDA), and the like, and multiple inductors, a resistor, and multiple capacitors may be applied to the passive equalizer 230. Examples of the resistor may include a fixed resistor and a variable resistor, and the inductor may induce a voltage in proportion to a change in current.

The passive equalizer 230 may be designed by using two inductors 232 and 234, one resistor 233, and two capacitors 231 and 235 so as to have a high impedance at low frequency of a signal, and to this end, may control a signal. The passive equalizer 230 may pass an Alternating Current (AC) component of the signal, and may block a Direct Current (DC) component thereof. Also, the passive equalizer 230 may be connected to the transmitter 210 and the receiver 220 through the first channel 240 and the second channel 250, respectively.

The passive equalizer 230 may cause the first inductor 232, the resistor 233, and the second inductor 234 to operate in a high frequency range of the signal, and may cause the first capacitor 231, the first inductor 232, the resistor 233, the second inductor 234, and the second capacitor 235 to operate in a low frequency range of the signal. The first capacitor 231 may be connected in parallel to the first channel 240, the first inductor 232 may be connected in series to the first capacitor 231, the resistor 233 may be connected in series to the first inductor 232, the second inductor 234 may be connected in series to the resistor 233, and the second capacitor 235 may be connected in series to the second inductor 234 and may be connected in parallel to the second channel 250.

The transmitter 210, and the receiver 220, and the passive equalizer 230 may be included in one electronic apparatus, such as a portable terminal or a PC. The transmitter 210 and the passive equalizer 230 may be included in a control unit, such as a Central Processing Unit (CPU) of a PC or an Application Processor (AP) of a portable terminal, and the receiver 220 may be formed with a USB terminal of the PC or portable terminal. Also, the passive equalizer 230 may be implemented as an element separated from the CPU or AP.

Figure 3:
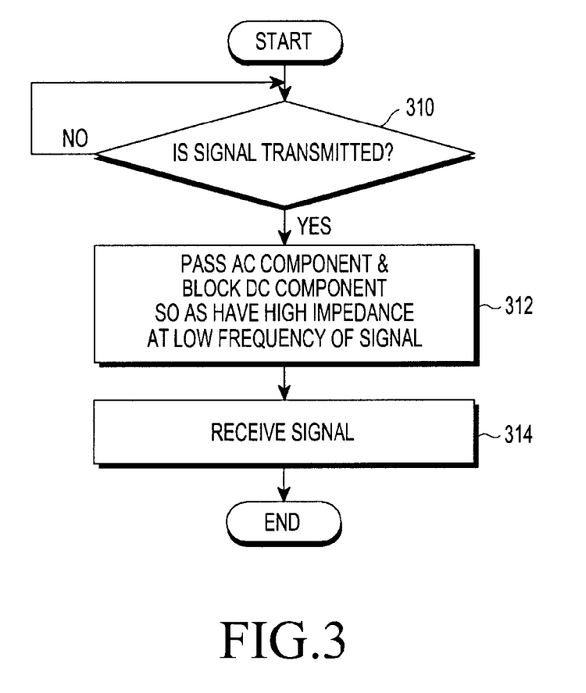
FIG. 3 is a flowchart illustrating a method for improving the quality of a transmitted signal in a signal transmission system according to an embodiment of the present disclosure.

Certain embodiments may comprise a first electronic device and a second electronic device, wherein the first electronic device and second electronic device include transceivers for bi-directional communication. Transmitter shall include a transceiver when the transceiver is transmitting. Receiver shall include a transceiver that is receiving. In some embodiments, the equalizer can be integrated with the first electronic device only, both electronic devices, or the second electronic devices. Furthermore the first and second electronic devices can be connected by a cable. One of the first and second electronic devices can be a host device. FIG. 3 is a flowchart illustrating a method for improving the quality of a transmitted signal in a signal transmission system according to an embodiment of the present disclosure.

When a transmitter transmits a signal in operation 310, in operation 312, a passive equalizer may pass an AC component of a signal and may block a DC component of the signal so as to have a high impedance at a low frequency of the signal which is received. The passive equalizer may control the signal so as to have a high impedance at a low frequency of the transmitted signal. The passive equalizer may cause the first inductor, the resistor, and the second inductor to operate in a high frequency range of the signal, and may cause the first capacitor, the first inductor, the resistor, the second inductor, and the second capacitor to operate in a low frequency range of the signal. The first capacitor may be connected in parallel to the first channel, the first inductor may be connected in series to the first capacitor, the resistor may be connected in series to the first inductor, the second inductor may be connected in series to the resistor, and the second capacitor may be connected in series to the second inductor and may be connected in parallel to the second channel.

In operation 314, a receiver may receive a signal from the passive equalizer. The transmitter 210, and the receiver 220, and the passive equalizer 230 may be included in one electronic apparatus, such as a portable terminal and a PC. The transmitter 210 and the passive equalizer 230 may be included in a control unit, such as a Central Processing Unit (CPU) of a PC or an Application Processor (AP) of a portable terminal, and the receiver 220 may be formed with a USB terminal of the PC or portable terminal. Also, the passive equalizer 230 may be implemented as an element separated from the CPU or AP.

Figure 4A:
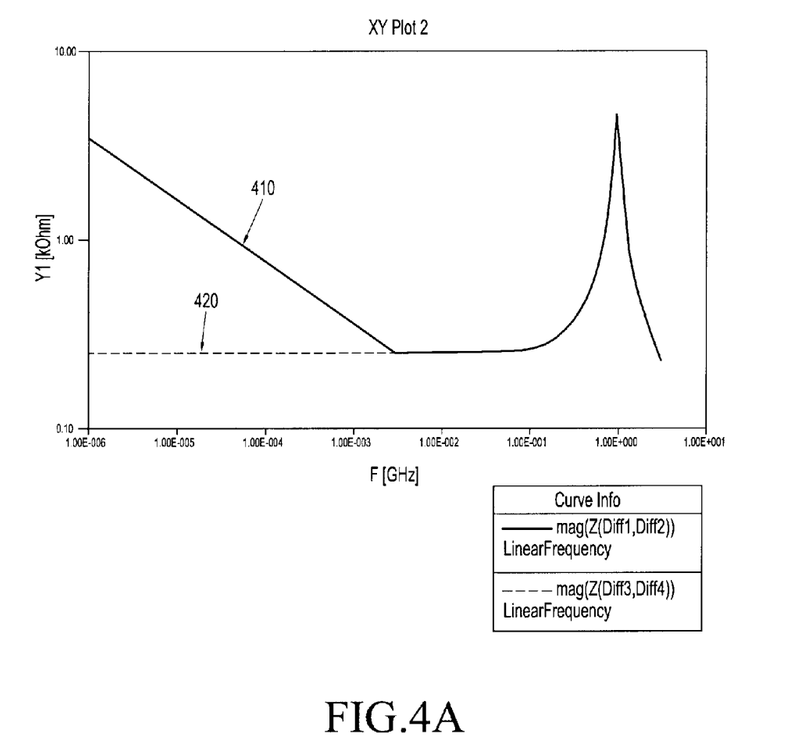
FIG. 4A is a view illustrating an example of a result of simulating a differential impedance of a conventional passive equalizer having an L-R structure and a differential impedance of a passive equalizer having a C-L-R structure according to an embodiment of the present disclosure.
Figure 4B:
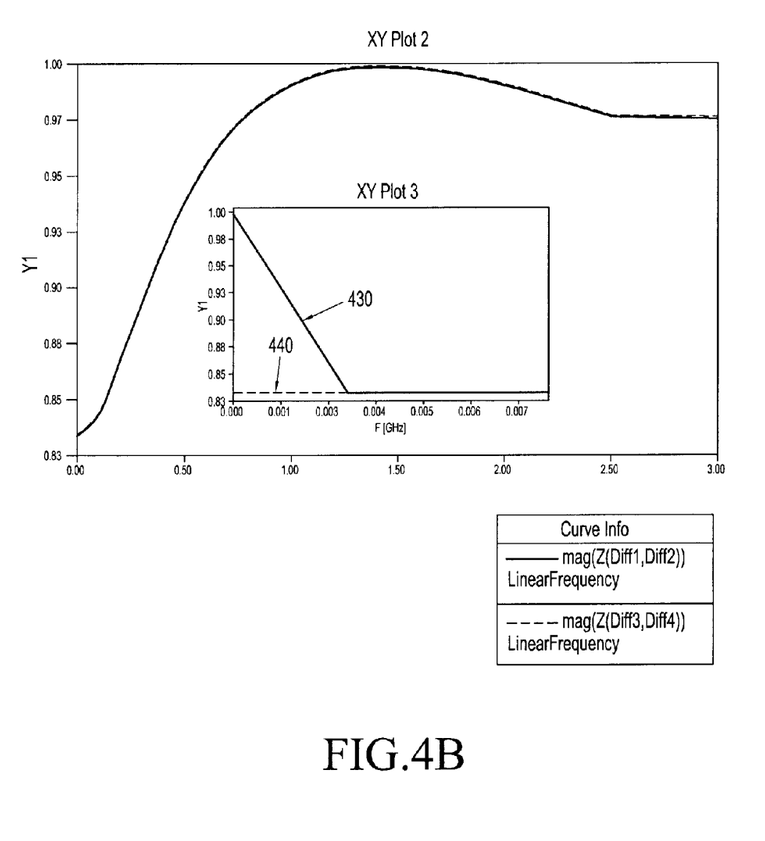
FIG. 4B is a view illustrating an example of a result of simulating an insertion loss of the conventional passive equalizer having the L-R structure and an insertion loss of the passive equalizer having the C-L-R structure according to an embodiment of the present disclosure.

FIG. 4A is a graph of the differential impedance of a passive equalizer having an L-R structure and a differential impedance of a passive equalizer having a C-L-R structure as a function of signal frequency, according to an embodiment of the present disclosure. FIG. 4B is a graph of insertion loss of the passive equalizer having the L-R structure and insertion loss of the passive equalizer having the C-L-R structure as a function of frequency according to an embodiment of the present disclosure.

Referring to FIG. 4A, the passive equalizer having the L-R structure and the passive equalizer having the C-L-R structure are similar in an impedance characteristic curve in a high frequency band (e.g., 1-10 MHz or higher) However, in a low frequency band (e.g., 1 MHz or lower), an impedance 410 of the passive equalizer having the C-L-R structure according to an embodiment of the present disclosure is higher than an impedance 420 of the passive equalizer having the L-R structure. At a signal frequency of 1000 Hz, the C-L-R structure has an impedance exceeding 1500 ohms.

In certain embodiments, the combined capacitance of the two capacitors 231 and 235, can be within 10% of 100 nF, the combined inductance of the two inductors 232 and 234 can be within 10% of 300 nH, and the resistance of the resistor 233 can be within 10% of 300 ohms.

Referring to FIG. 4B, the passive equalizer having the L-R structure and the passive equalizer having the C-L-R structure are not much different in signal transfer characteristics therebetween in a high frequency band (higher than 3 MHz). However, in a low frequency band (less than 3 MHz) transfer characteristics 430 of the passive equalizer having the C-L-R structure according to an embodiment of the present disclosure are better than transfer characteristics 440 of the conventional passive equalizer having the L-R structure.

Figure 5A:
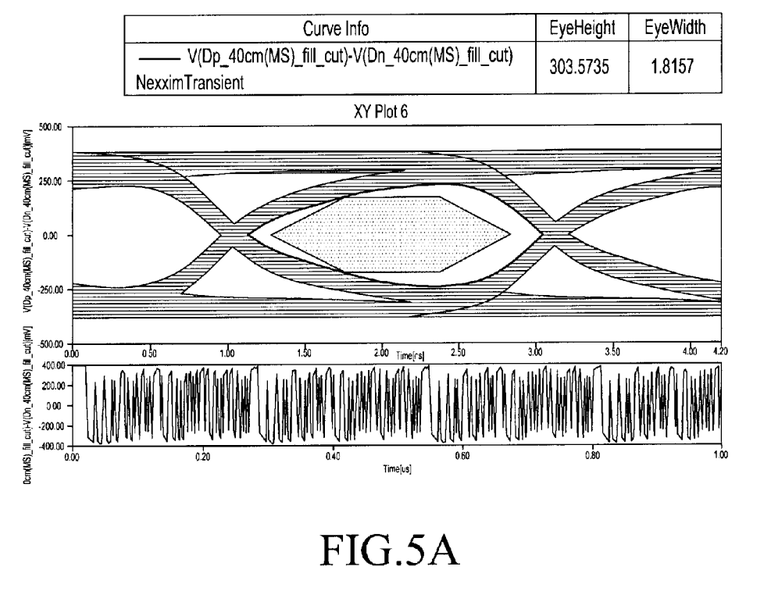
FIG. 5A is a view illustrating an example of signal quality in a case where a conventional passive equalizer having an L-R structure is not applied.
Figure 5B:
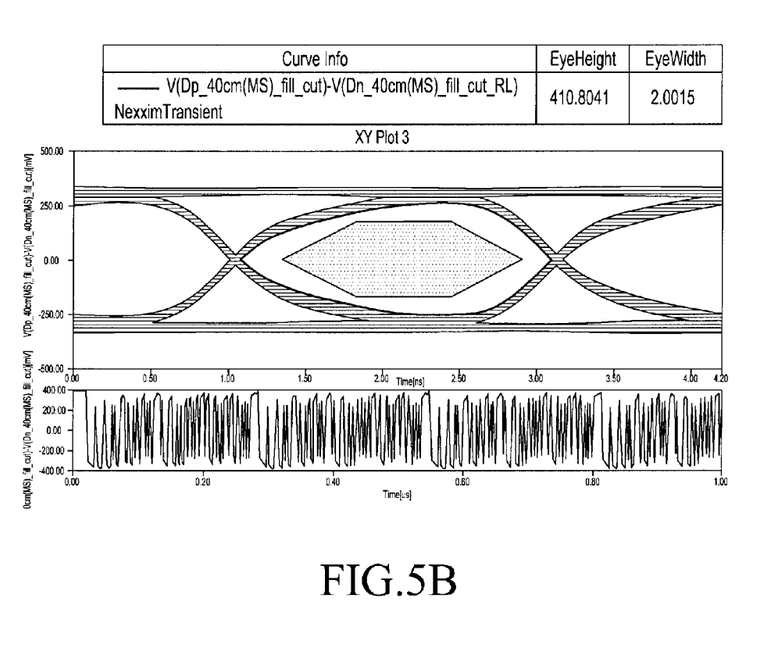
FIG. 5B is a view illustrating an example of signal quality in a case where the conventional passive equalizer having the L-R structure is applied.
Figure 5C:
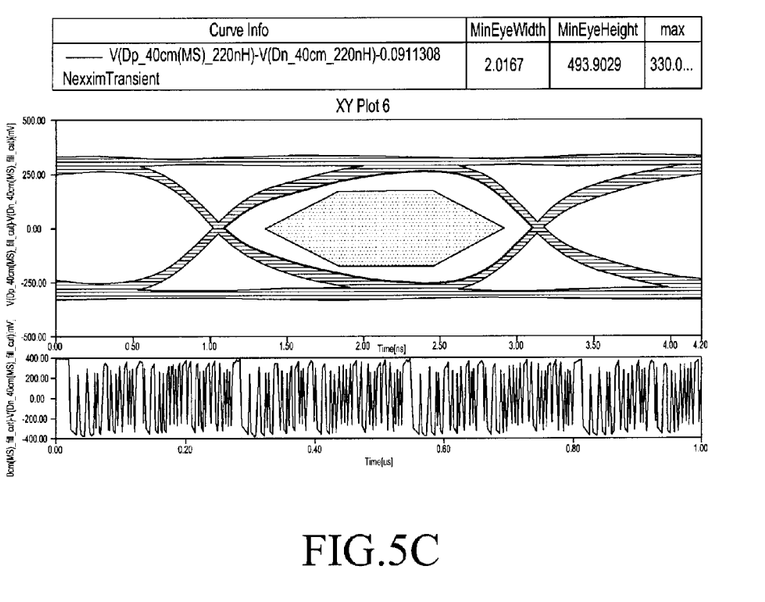
FIG. 5C is a view illustrating an example of signal quality in a case where a passive equalizer having a C-L-R structure according to an embodiment of the present disclosure is applied.

FIG. 5A is a graph illustrating an example of signal quality in a case where a passive equalizer having an L-R structure is not applied. FIG. 5B is a graph illustrating an example of signal quality in a case where the passive equalizer having the L-R structure is applied. FIG. 5C is a graph illustrating an example of signal quality in a case where a passive equalizer having a C-L-R structure is applied.

FIGS. 5A to 5C each illustrate a result of eye-diagram simulation of a USB 2.0 differential signal at 480 Mbps by using Designer™ which is a simulator which analyzes signal quality.

Referring to FIG. 5A, loss over a channel without an equalizer causes an AC component of a high-speed signal to have a form of contacting an internal mask and to have a large noise component at the DC level ranging from −400 mV to 400 mV. As described above, when the conventional passive equalizer having the L-R structure or the passive equalizer having the C-L-R structure is not applied, the loss over the channel causes the AC component to come into contact with the internal mask, so that the transmission quality of the signal is reduced.

Referring to FIG. 5B, when a passive equalizer having the L-R structure is applied, a noise is greatly reduced. Also, an AC component is reinforced and does not contact an internal mask. However, when a USB 2.0 interface is actually used, the passive equalizer having the L-R structure has a low impedance at a lower frequencies, so that a device cannot be initially recognized. As described above, when the passive equalizer having the L-R structure is applied, the amplitude of a signal is reduced, but the characteristics of a high-speed AC component are improved and the eye margin of the signal is improved, and the noise is also reduced.

Referring to FIG. 5C, when the passive equalizer having the C-L-R structure according is applied and a USB 2.0 interface is actually used, the passive equalizer having the C-L-R structure may have a high impedance at a low frequencies. The performance in the case where the passive equalizer having the C-L-R structure is equal to that in the case where the passive equalizer having the L-R structure is applied as illustrated in FIG. 5B. Also, when the conventional USB 2.0 interface is actually used, it is possible to have a high impedance at lower frequencies and thus, making a device recognizable. Table 1 below shows the results illustrated in FIGS. 5A to 5C.

TABLE 1

|  | Before application of passive equalizer | Passive equalizer having L(300 nH)-R(300 ohm) structure | Passive equalizer having C(100 nF)-L(300 nH)-R(300 ohm) structure |
|---|---|---|---|
| Peak to Peak | 344.990 mV | 421.816 mV | 416.406 mV |
| MinEyeHeight | 443.207 mV | 505.515 mV | 499.195 mV |
| MinEyeWidth | 1.9083 ns | 2.02923 ns | 2.0167 ns |

The following is the formula for impedance for the values listed in Table 1:

$$Z(f) = abs[j/2pi(100 \times 10^{-9})f - j2pif(300 \times 10^{-9})f + 300]\ ohms$$

Where j=sqrt(-1)
pi=3.1415
f=signal frequency
abs=absolute value or magnitude
we derived this table. Please have the client select the pair they wish to use:
  f Z
  1 kHz abs [1592j+300] ohms As a result of applying the passive equalizer having the C-L-R structure according to an embodiment of the present disclosure as shown Table 1, it is possible to obtain improvements in the high-speed signal. Also, the application of the passive equalizer having the C-L-R structure according to an embodiment of the present disclosure makes it possible to obtain quality equal to that in a case where the passive equalizer having the L-R structure is applied, and makes it possible to obtain a high impedance in a low frequency band.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

Exemplary embodiments of the present disclosure shown and described in this specification and the drawings correspond to specific examples presented in order to easily describe technical contents of the present disclosure and to help comprehension of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

What is claimed is:

1. A signal transmission system for improving quality of a transmitted signal, the signal transmission system comprising:
   a transmitter that transmits a signal;
   a receiver that receives a controlled signal from the transmitter;
   a channel that is formed between the transmitter and the receiver and transmits the signal delivered by the transmitter; and
   a passive equalizer that is formed between the transmitter and the receiver and controls the signal so as to have a higher impedance than a predetermined impedance at a lower frequency than a predetermined frequency of the signal,
   wherein the passive equalizer comprises first and second capacitors, first and second inductors, and a resistor.

2. The signal transmission system as claimed in claim 1, wherein the passive equalizer passes an alternating current component of the signal, and blocks a direct current component of the signal.

3. The signal transmission system as claimed in claim 1, wherein the passive equalizer is connected to the transmitter and the receiver through a first channel and a second channel, respectively.

4. The signal transmission system as claimed in claim 1, wherein the passive equalizer causes the first inductor, the resistor, and the second inductor to operate in a range of a higher frequency than the predetermined frequency of the signal, and causes the first capacitor, the first inductor, the resistor, the second inductor, and the second capacitor to operate in a range of the lower frequency of the signal.

5. The signal transmission system as claimed in claim 1, wherein the first capacitor is connected in parallel to a first channel formed between the transmitter and the receiver, the first inductor is connected in series to the first capacitor, the resistor is connected in series to the first inductor, the second inductor is connected in series to the resistor, and the second capacitor is connected in series to the second inductor and is connected in parallel to a second channel formed between the transmitter and the receiver.

6. The signal transmission system of claim 5, wherein a sum of the capacitance of the first capacitor and the second capacitor is between 90-110 nF, wherein a sum of the inductance of the first inductor and the second inductor is between 270 nH-330 nH, and the resistance of the resistor is between 270-330 ohms.

7. The signal transmission system of claim 1, wherein the predetermined impedance is 1500 ohms, and the predetermined frequency is 1000 Hz.

8. An electronic apparatus comprising: the transmitter, the receiver, the channel, and the passive equalizer as claimed in claim 1.

9. The electronic apparatus as claimed in claim 8, wherein the electronic apparatus is connected to an external electronic apparatus through the receiver, the electronic apparatus serves as a host when the external electronic apparatus is a Universal Serial Bus (USB), and the electronic apparatus serves as a device when the external electronic apparatus is a Personal Computer (PC).

10. A method for improving quality of a transmitted signal in a signal transmission system, the method comprising:
transmitting a signal, by a transmitter;
controlling the transmitted signal so as to have a higher impedance than a predetermined impedance at a lower frequency than a predetermined frequency of the signal, by a passive equalizer; and
receiving the controlled signal, by a receiver,
wherein the passive equalizer comprises first and second capacitors, first and second inductors, and a resistor.

11. The method as claimed in claim 10, wherein the controlling of the transmitted signal comprises passing an alternating current component of the signal and blocking a direct current component of the signal, by the passive equalizer.

12. The method as claimed in claim 10, wherein the passive equalizer comprises first and second capacitors, first and second inductors, and a resistor, and wherein the controlling of the transmitted signal comprises causing the first inductor, the resistor, and the second inductor to operate in a high frequency range of the signal, and causing the first capacitor, the first inductor, the resistor, the second inductor, and the second capacitor to operate in a low frequency range of the signal.

13. The method as claimed in claim 12, wherein a sum of the capacitance of the first capacitor and the second capacitor is between 90-110 nF, wherein a sum of the inductance of the first inductor and the second inductor is between 270 nH-330 nH, and the resistance of the resistor is between 270-330 ohms.

14. The method as claimed in claim 10, wherein the predetermined impedance is 1500 ohms, and the predetermined frequency is 1000 Hz.

* * * * *